United States Patent
Loemba et al.

(10) Patent No.: US 10,215,234 B2
(45) Date of Patent: Feb. 26, 2019

(54) ROLLING BEARING CAGE OR ROLLING BEARING CAGE SEGMENT, AND METHOD FOR MANUFACTURING A ROLLING BEARING CAGE OR ROLLING BEARING CAGE SEGMENT

(71) Applicant: Aktiebolaget SKF, Gothenburg (SE)

(72) Inventors: Anselme Loemba, Niederwern (DE); Joanna Dzwonczyk, Ijsselstein (NL); Alfred Weidinger, Niederwern (DE)

(73) Assignee: Aktiebolaget SKF, Göteborg (SE)

( * ) Notice: Subject to any disclaimer, the term of this patent is extended or adjusted under 35 U.S.C. 154(b) by 136 days.

(21) Appl. No.: 15/316,628

(22) PCT Filed: Jul. 24, 2015

(86) PCT No.: PCT/EP2015/066969
§ 371 (c)(1),
(2) Date: Dec. 6, 2016

(87) PCT Pub. No.: WO2016/016111
PCT Pub. Date: Feb. 4, 2016

(65) Prior Publication Data
US 2018/0149199 A1  May 31, 2018

(30) Foreign Application Priority Data
Jul. 31, 2014 (DE) .................. 10 2014 215 066

(51) Int. Cl.
*F16C 33/56* (2006.01)
*C22C 21/02* (2006.01)
(Continued)

(52) U.S. Cl.
CPC .............. *F16C 33/56* (2013.01); *C22C 21/02* (2013.01); *C22C 21/08* (2013.01); *C22C 21/10* (2013.01);
(Continued)

(58) Field of Classification Search
CPC ................. F16C 33/56; F16C 33/44
See application file for complete search history.

(56) References Cited

U.S. PATENT DOCUMENTS

| 7,919,056 | B2 * | 4/2011 | Roberge | B01J 19/0093 422/130 |
| 9,670,567 | B2 * | 6/2017 | Jarry | B22D 1/00 |
| 2005/0006010 | A1 * | 1/2005 | Benedictus | C22C 21/10 148/552 |

FOREIGN PATENT DOCUMENTS

| DE | 10037138 C1 | 10/2001 |
| DE | 102010044886 A1 | 5/2011 |

(Continued)

OTHER PUBLICATIONS

Machine translation of DE 102020042849.*
(Continued)

*Primary Examiner* — Thomas R Hannon
(74) *Attorney, Agent, or Firm* — Bryan Peckjian; SKF USA Inc. Patent Dept.

(57) ABSTRACT

A rolling-element bearing cage or rolling-element bearing cage segment is formed from aluminum alloy AA6082 and/or AA7020 and may have a tensile strength of at least 350 MPa and/or a yield strength of at least 310 MPa and/or a hardness of at least 100 HBW. Also a method of forming a rolling-element bearing cage or rolling-element bearing cage segment from aluminum alloy AA6082 and/or AA 7020.

16 Claims, 2 Drawing Sheets

(51) Int. Cl.
*C22C 21/10* (2006.01)
*F16C 33/44* (2006.01)
*C22C 21/14* (2006.01)
*C22C 21/16* (2006.01)
*C22C 21/18* (2006.01)
*C22C 30/02* (2006.01)
*C22C 30/06* (2006.01)
*C22C 21/08* (2006.01)

(52) U.S. Cl.
CPC .............. *C22C 21/14* (2013.01); *C22C 21/16* (2013.01); *C22C 21/18* (2013.01); *C22C 30/02* (2013.01); *C22C 30/06* (2013.01); *F16C 33/44* (2013.01); *F16C 2202/04* (2013.01); *F16C 2202/06* (2013.01); *F16C 2202/08* (2013.01); *F16C 2204/20* (2013.01); *F16C 2220/40* (2013.01); *F16C 2220/60* (2013.01); *F16C 2226/54* (2013.01)

(56) References Cited

FOREIGN PATENT DOCUMENTS

| | | |
|---|---|---|
| DE | 102010042849 A1 | 4/2012 |
| DE | 102010047142 A1 | 4/2012 |
| DE | 102012216810 A1 | 3/2014 |
| JP | 2009257416 A | 11/2009 |
| WO | 2005100623 A2 | 10/2005 |
| WO | 2010066293 A1 | 6/2010 |

OTHER PUBLICATIONS

Machine translation of JP2009257416.*
Traid Villarroya Hermanos S A /Materialdetenblad.
Traid Villarroya Hermanos S A /Materialdatenblat.
ALLEGA /Katalogauszug Stangen und Rohre aus EN.
Matthais Bohm, Utilis AG / Alu-Trockenbearbeitu PcBN-Sinterstahlfertigu, Dated Jan. 4, 2011.

* cited by examiner

ROLLING BEARING CAGE OR ROLLING BEARING CAGE SEGMENT, AND METHOD FOR MANUFACTURING A ROLLING BEARING CAGE OR ROLLING BEARING CAGE SEGMENT

CROSS-REFERENCE

This application is the U.S. National Stage of International Application No. PCT/EP2015/066969 filed on Jul. 24, 2015, which claims priority to German patent application no. 10 2014 215 066.3 filed on Jul. 31, 2014.

TECHNOLOGICAL FIELD

Exemplary embodiments relate to a rolling-element bearing cage or a rolling-element bearing cage segment as well as a method for manufacturing a rolling-element bearing cage or a rolling-element bearing cage segment.

BACKGROUND

In many cases rolling-element bearing cages or rolling-element bearing cage segments are used in different rolling-element bearings in order to guide rolling elements of the rolling-element bearing or space them from one another. For this purpose rolling-element bearing cages can have a variety of designs and materials. The design and also the chosen material can be directed, for example, toward a bearing type and application wherein the rolling-element bearing cage is used.

Some rolling-element bearing cages are at least partially manufactured from brass. The acquisition cost of brass is relatively high since one component of brass, namely copper, is a relatively scarce material. In addition, lead is used in many manufacturing processes for rolling-element bearing cages made from brass. This can pose, for example, particular challenges for environmental and/or worker protection. A cost for the manufacture of brass cages can also thereby be increased.

SUMMARY

There is therefore a need to provide an improved rolling-element bearing cage or a rolling-element bearing cage segment that is simple to manufacture. This need is met by a rolling-element bearing cage or a rolling-element bearing cage segment or a method for manufacturing a rolling-element bearing cage or a rolling-element bearing cage segment as described hereinafter.

Exemplary embodiments relate to a rolling-element bearing cage or rolling-element bearing cage segment, which comprises as material an aluminum alloy AA6082 and/or AA7020. Since the mentioned aluminum alloys are used as material, in some exemplary embodiments conventional rolling-element bearing cages made from brass can be replaced. Furthermore, in some exemplary embodiments the rolling-element bearing cages made from the aluminum alloy can have a lower weight compared to rolling-element bearing cages comparable in shape and size. Under certain circumstances an energy consumption in an operating or a moving of a bearing connection can thereby be reduced with the rolling-element bearing cage. In the present application all features that are disclosed in the context of a rolling-element bearing cage can also be implemented in a rolling-element bearing cage segment.

In addition, the material or the aluminum alloy can have a tensile strength of at least 310 MPa. Here the tensile strength can be a material parameter that is specified in force per unit area and is specified by the symbol $R_m$. Additionally or alternatively, in some exemplary embodiments the material can have a yield strength of at least 260 MPa. The yield strength can be, for example, a material parameter that specifies a tension applied to a body, which after release results in a slight deformation of 0.2% and is referred to as $R_{p0.2}$. Additionally or alternatively the material can also have a hardness of at least 100 HBW and an A5 elongation of at least 10%. Due to the mechanical values mentioned of the material, in some exemplary embodiments the rolling-element bearing cage can obtain similar or even better mechanical properties than a conventional brass cage. Under certain circumstances the hardness of the chosen material can also be relevant for a later processing. With high or high-strength alloys the problem can arise in some exemplary embodiments that these are not rivetable. Under certain circumstances with too-low hardness or a too-soft material a cold welding can occur. Furthermore, too-soft materials can possibly not be processed dry.

Additionally or alternatively the rolling-element bearing cage can be free of lead. In some exemplary embodiments precautions that serve to prevent lead from reaching the environment or for particular protection of workers from lead can be omitted. In an analogous manner, for example, a manufacturing of the rolling-element bearing cage can also occur in a lead-free manner so that lead also does not arise as a processing aid or intermediate product. In some exemplary embodiments the rolling-element bearing cage can be manufactured with the lowest possible burdens on the environment.

In some exemplary embodiments the rolling-element bearing cage is machined from a semi-finished product, which has been subjected to a T6 heat treatment. In some exemplary embodiments the rolling-element bearing cage can thus obtain the required mechanical properties.

Exemplary embodiments further relate to a method for manufacturing a rolling-element bearing cage or a rolling-element bearing cage segment. With the method the rolling-element bearing cage or the rolling-element bearing cage segment is formed from an aluminum alloy AA6082 and/or AA7020. Since the mentioned aluminum alloys are used as material, in some exemplary embodiments conventional rolling-element bearing cages made from brass can be replaced. Furthermore, in some exemplary embodiments the rolling-element bearing cages made from the aluminum alloy can have a low weight.

In addition, a forming of the rolling-element bearing cage can comprise a machining of a semi-finished product made from the aluminum alloy AA6082 and/or AA7020. In some exemplary embodiments the cage geometry can thus be manufactured very precisely. Furthermore, possibly desired surface properties of the cage can thus be generated.

Under certain circumstances the machining can take place dry. Since no cooling lubricant or other liquid is used, in some exemplary embodiments a cleaning effort of the rolling-element bearing cage, the environment, and/or a processing tool can be reduced and/or even completely omitted. A collecting and/or treatment of the cooling lubricant can also be omitted.

Additionally or alternatively the method can comprise a manufacturing of the semi-finished product, wherein the manufacturing of the semi-finished product comprises a shaping of a rod made from the aluminum alloy. In some exemplary embodiments the rolling-element bearing cage can then be machined from a semi-finished product that already has a favorable initial geometry. For example, the rod can be extruded.

Under certain circumstances the manufacturing of the semi-finished product can alternatively also comprise a forming of a tube. In some exemplary embodiments a volume that is machined, for example in a radially inner region, can thus be reduced. For example, the tube can be drawn for this purpose.

Additionally or alternatively, in some exemplary embodiments the manufacturing of the semi-finished product comprises a forming of a tube from a rod. In some exemplary embodiments the semi-finished product can thus obtain the desired properties and the desired shape.

Furthermore, the method can comprise a T6 heat treatment of the aluminum alloy, of the semi-finished product, of the rod, and/or of the tube. In some exemplary embodiments a manufacturing of the tube from the rod can thereby be simplified since the heat treatment is only performed on the tube. Since the heat treatment occurs, in some exemplary embodiments the semi-finished product, for example, the tube, can obtain the described mechanical properties. A T6 heat treatment can comprise, for example, a quenching in a solution and/or water and using a solid. An aging can subsequently occur, for example, by an air cooling. In some exemplary embodiments the T6 heat treatment can comprise only the processes mentioned. Optionally the T6 heat treatment can also comprise a solution annealing, a quenching, and an artificial aging, or be comprised entirely of these processes.

Additionally or alternatively the method can comprise a riveting of a plurality of rolling-element bearing cage segments. In some exemplary embodiments the rolling-element bearing cage can thus be assembled from individual parts. This can be favorable, for example, for assembly- and/or transport-purposes, particularly with large rolling-element bearing cages. Here the individual parts or a rolling-element bearing cage segment can be, for example, a bridge, a side ring, a segment of a side ring, a flange, a section of a bridge and/or a rolling-element bearing cage segment, which comprises at least one bridge and at least one further section, for example, a segment of a side ring.

The exemplary embodiments and their individual features disclosed in the above description, the following claims, and the accompanying Figures can be meaningful and implemented both individually and in any combination for the realization of an exemplary embodiment in its various designs.

BRIEF DESCRIPTION OF THE DRAWINGS

The Figures thus schematically show the following views.

DETAILED DESCRIPTION

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 1:
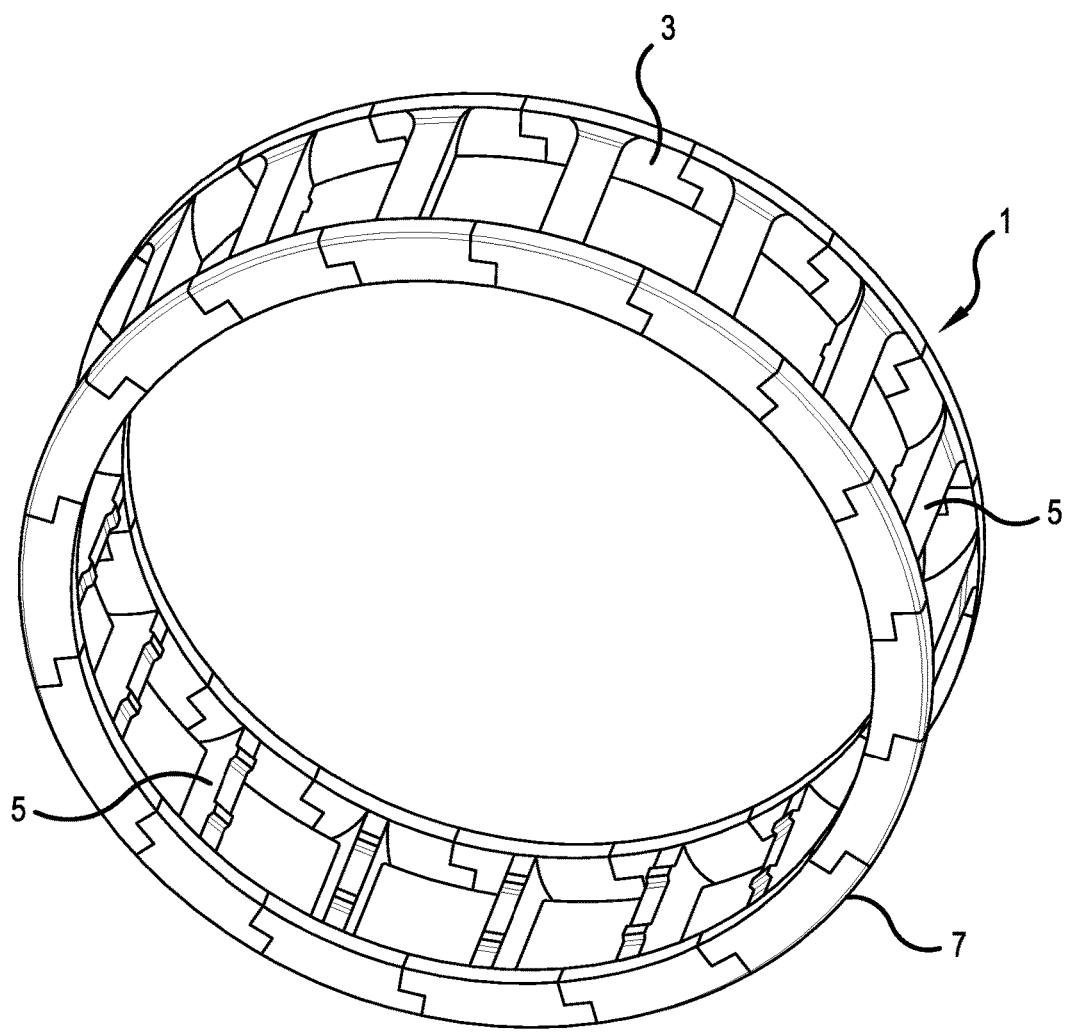
FIG. 1 shows a schematic depiction of a perspective view of a rolling-element bearing cage according to an exemplary embodiment.

FIG. 1 shows a schematic depiction of a perspective view of a rolling-element bearing cage 1 according to an exemplary embodiment.

The rolling-element bearing cage 1 comprises an aluminum alloy as material. The aluminum alloy is AA6082 and/or AA7020. The rolling-element bearing cage 1 comprises a plurality of rolling-element bearing cage segments 3. The rolling-element bearing cage segment 3 can also be manufactured from one of the mentioned materials. In some exemplary embodiments, since the mentioned aluminum alloys are used as material, conventional rolling-element bearing cages made of brass can be replaced. In some further exemplary embodiments not depicted the rolling-element bearing cage segment can have another shape and not be connected to other rolling-element bearing cage segments.

The rolling-element bearing cage 1 of FIG. 1 can be used in a tapered roller bearing. In some further exemplary embodiments not depicted the rolling-element bearing cage or the rolling-element bearing cage segment can also be configured to be used in other rolling-element bearings, for example, needle roller bearings, cylindrical roller bearings, barrel roller bearings, or the like. Here it can respectively be a cage for a single-row- or also for a multi-row-bearing. The rolling-element bearing cage can also be configured for use in a multi-row tapered roller bearing.

In addition to aluminum (Al) the aluminum alloy AA6082 comprises as alloy components magnesium (Mg) with a proportion of 0.8 weight percent, silicon (Si) with a proportion of 1.1 weight percent, manganese with a proportion of 0.7 weight percent, and iron (Fe) with a proportion of 0.2 weight percent, each based on the weight proportion of aluminum.

Furthermore, in some exemplary embodiments the aluminum alloy AA6082 can include magnesium (Mg) with a proportion between 0.6 and 1.0 weight percent, manganese (Mn) with a proportion between 0.4 and 1.0 weight percent, silicon (Si) with a proportion between 0.9 and 1.3 weight percent, chromium (Cr) with a proportion of equal to or less than 0.25 weight percent, iron (Fe) with a proportion of equal to or less than 0.3 weight percent, zinc (Zn) with a proportion of equal to or less than 0.2 weight percent, copper (Cu) with a proportion of equal to or less than 0.1 weight percent, titanium (Ti) with a proportion of equal to or less than 0.1 weight percent, all other components with a proportion of equal to or less than 0.5 weight percent, other components with a proportion of equal to or less than 0.05 weight percent, and a remaining component of aluminum (Al). Here the proportions of all alloy components add up to 100 weight percent.

In addition to aluminum (Al) the aluminum alloy AA7020 comprises as alloy components zinc (Zn) with a proportion of 4.5 weight percent, magnesium (Mg) with a proportion of 1.2 weight percent, as well as manganese (Mn), chromium (Cr), and zirconium (Zr), each based on a weight percent of aluminum. For example, manganese (Mn) can be present with a component of 0.1 weight percent, chromium (Cr) with a component of 0.15 weight percent, and zirconium (Zr) with a component of 0.14 weight percent based on a weight percent of aluminum.

Furthermore, in some exemplary embodiments the aluminum alloy AA7020 can include zinc with a proportion between 4.0 and 5.0 weight percent, magnesium (Mg) with a proportion between 1.0 and 1.4 weight percent, manganese (Mn) with a proportion between 0.05 and 0.5 weight percent, iron (Fe) with a proportion of equal to or less than 0.30 weight percent, silicon (Si) with a proportion of equal to or less than 0.30 weight percent, chromium (Cr) with a proportion between 0.1 and 0.35 weight percent, zirconium (Zr) with a proportion between 0.08 and 0.2 weight percent, copper (Cu) with a proportion of equal to or less than 0.2 weight percent, all other components with a proportion of equal to or less than 0.15 weight percent, other components with a proportion of equal to or less than 0.05 weight percent, and a remaining proportion of aluminum (Al). Here the proportions of all alloy components add up to 100 weight percent.

Here the rolling-element bearing cage 1 is manufactured entirely from one of the mentioned alloys. In some further exemplary embodiments not depicted the rolling-element bearing cage can comprise still other raw materials or materials in addition to the mentioned aluminum alloy or aluminum alloys. Here this can be a coating, a lubricant, and/or connecting structures or the like. The connecting structures can be, for example, rivets.

The rolling-element bearing cage 1 can optionally be free of lead. Under certain circumstances a manufacturing of the cage can also occur without a use of lead, or lead that would be harmful to health can be avoided.

Figure 2:
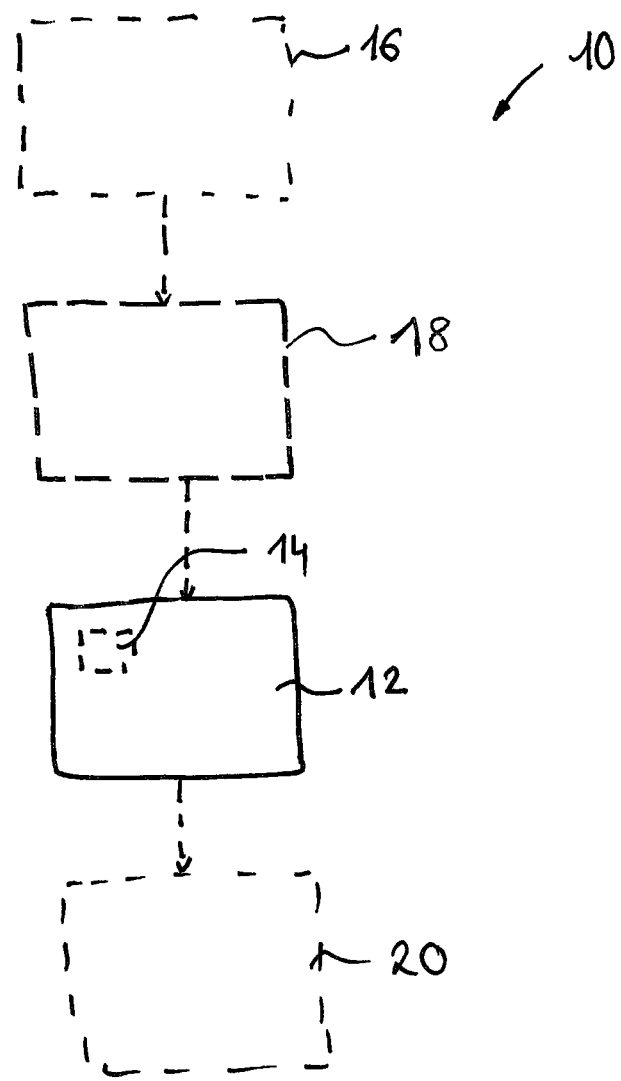
FIG. 2 shows a schematic depiction of a method for manufacturing a rolling-element bearing cage or a rolling-element bearing cage segment according to an exemplary embodiment.

FIG. 2 shows a schematic depiction of a method 10 for manufacturing a rolling-element bearing cage or a rolling-element bearing cage segment according to an exemplary embodiment. In the method 10 the rolling-element bearing cage or the rolling-element bearing cage segment is formed in a process 12 from an aluminum alloy AA6082 and/or AA7020.

For example, in some cases the rolling-element bearing cage made from the aluminum alloy AA6082 can also be suited for use in the beverage- and/or food-industry. This can be, for example, more favorable than a use of AA7020, since the alloy AA6082 includes fewer alloy elements than the alloy AA7020 and is thus "cleaner." In addition, the alloy AA6082 also has very good corrosion properties.

The properties of the material can be influenced by the individual alloy components of the chosen alloy. For example, magnesium can increase a strength and a hardness of the material, support its corrosion resistance, and improve its weldability. The higher strength can arise, for example, due to a solid solution strengthening. The hardness can potentially be increased by more than 6% by a precipitation heat treatment. Silicon can improve a heat-treatability of alloys and, in combination with magnesium (Mg), support the corrosion resistance. Furthermore, under certain conditions a flowability can be improved and a shrinking can be reduced (to 0 for a proportion of 25% Si). Due to these properties a use as casting alloy is broadened (for >6% Si). Zinc (Zn) can increase a strength and a hardness as well as possibly reduce a shrinking and a heat checking. In combination with Magnesium (Mg) a heat-treatability as well as a strength of the alloy can possibly be improved. Manganese, chromium, and zirconium are transition elements that are usually added in order to refine a microstructure. In addition, manganese can possibly increase a flexibility and a corrosion resistance. In combination with iron, under certain circumstances a casting capacity can also be improved. An emergence of intermetallic compounds can also possibly be influenced. A deformability of the material as well as a ductility can potentially be increased. In some cases shrinking can also thereby be reduced.

The process 12, i.e., a forming of the rolling-element bearing cage, can comprise a further process 14 wherein a semi-finished product is machined. The semi-finished product here is manufactured from the aluminum alloy AA6082 and/or AA7020. The semi-finished product can be, for example, a prefabricated object. This can arise, for example, at the beginning of a manufacturing process and then further processed. Here they can possibly be extruded, pressed, drawn, deep-drawn, rolled, and/or extruded components. Under certain circumstances semi-finished products can be a metal plate, a rod, a tube, a plate, a coil, or the like. The semi-finished product can be, for example, a tube or a rod.

A metal cutting or a machining of a component, for example, of a semi-finished product, can indicate, for example, a mechanical processing method wherein a raw material or a material is brought into a desired form by removing excess raw material or material in the form of chips. Such mechanical processing methods can be, for example, turning, milling, boring, sawing, and/or grinding.

Under certain circumstances the machining in process 14 can be effected without the use of cooling lubricant or another liquid. The selected materials can be dry-processed.

The method 10 can also optionally comprise a further process 16, wherein the semi-finished product is manufactured. The process 16 can temporally precede the process 12. The manufacturing of the semi-finished product can comprise a forming of a rod from the aluminum alloy. Under certain circumstances the manufacturing of the semi-finished product can alternatively also comprise a forming of a tube. Additionally or alternatively in some exemplary embodiments the manufacturing of the semi-finished product in process 16 comprises a forming of a tube from a rod. For example, the rod can be extruded. For example, the tube can be drawn from the rod. In some cases tube material can have a higher strength than rod products.

Furthermore, in a further process 18 the method can comprise a T6 heat treatment of the tube, which has been manufactured from the rod. Because the heat treatment occurs the material AA6082 can receive the following mechanical properties: a tensile strength $R_m$ of at least 350 MPa, and a yield strength $R_{p0.2}$ of at least 310 MPa, and an A5 elongation of 10%. In an analogous manner the material AA6082 can receive the following mechanical properties: a tensile strength $R_m$ of at least 380 MPa, and a yield strength $R_{p0.2}$ of at least 340 MPa, and an A5 elongation of 10%. Furthermore, the materials examined here have the minimum fatigue strength:

AA6082 T6--->130 MPa

AA7020 T6--->135 MPa

These values apply for a failure probability of 10% with 107 cycles for alternating rotating bending stress resistance. In comparison thereto a different heat treatment, for example, a T0 heat treatment, would only lead to a tensile strength $R_m$ of at most 160 MPa or 200 MPa, a yield strength $R_{p0.2}$ of at most 110 MPa or 150 MPa, and to an A elongation of 14%.

A T6 heat treatment can comprise, for example, a duplex sequence of solution/water-solid quenching, then aging/air-cooling, or be comprised entirely of these. Optionally the T6 heat treatment can also comprise a solution annealing, a quenching, and an artificial aging, or be comprised entirely of these. The materials can thus have other mechanical properties after the extrusion. In an analogous manner to a variation of extrusion parameters the variation can be too high. A relationship between a temperature reduction and an extrusion speed can determine the mechanical properties. Thus these are also dependent on an extruder and its machine capabilities. Under certain circumstances the mechanical properties can be changed in a desired direction by the heat treatment.

Additionally or alternatively in a process 20 the method 10 can comprise a riveting of a plurality of rolling-element bearing cage segments. The two alloys have shown that they can be riveted, a property that is very important for some cage types. In some exemplary embodiments the rolling-element bearing cage can thus be assembled from individual parts. The individual parts or a rolling-element bearing cage segment here can be, for example, a bridge 5 or a side ring 7, as depicted in FIG. 1. Furthermore, the individual part can also be a segment of a side ring 7, a flange, a section of a bridge 5, and/or rolling-element bearing cage segments that comprise at least one bridge and at least one further section, for example, a segment of a side ring.

Due to the selected materials the rolling-element bearing cage 1 can thus be manufactured with lower effort compared to a brass cage. This can be possible, for example, because the rolling-element bearing cage 1 or the method 10 can provide an independence from an increase of the copper price and from a shortage of copper. A further reason can be because a use of lead in production and during the manufacturing process can be avoided.

New, tested light-metal-material light-metal alloys (AA6082 T6, AA6082 T6 "modified" (from English: modified), AA7020 T6) are used for the replacement of brass cages for rolling-element bearing cage manufacturing, which light-metal material light-metal alloys have been subjective to a special thermal heat treatment T6 and are lead-free. Under certain circumstances a worldwide replacement of brass, used for rolling-element bearing cages, can thereby be made possible by a more cost-effective light-metal alloy having at least the same technical properties. Furthermore, for example, tribological and/or running properties can also be improved for demanding applications. A saving of material costs as well as improved mechanical and/or chemical properties can possibly also result. Under certain circumstances a reduction of material can result from the lower density of the light metals.

In an exemplary embodiment of the method 10 for manufacturing the rolling-element bearing cage 1 the aluminum alloy is formed into a rod, for example, extruded. A tube is then drawn from the rod. This can be referred to as manufacturing of the semi-finished product in the process 16. Due to the forming into a tube a strength of the material can possibly be increased. In the process 18 the tube is subsequently subjected to the T6 heat treatment. Since the heat treatment is only performed after the forming into the tube, in some exemplary embodiments the forming itself can occur better. The tube, which can also be referred to as tube material, is subsequently dry turned and/or milled in process 14. In some exemplary embodiments the cage can thereby receive its geometry with a smallest-possible contamination of the tools, the workpieces, and the environment.

In the present application all features that are disclosed in the context of a rolling-element bearing cage can also be implemented in a rolling-element bearing cage segment.

The exemplary embodiments and their individual features disclosed in the above description, the following claims, and the accompanying Figures can be meaningful and implemented both individually and in any combination for the realization of an exemplary embodiment in its various designs.

In some further exemplary embodiments, features that are disclosed in other exemplary embodiments as device features can also be implemented as method features.

Furthermore, features that are implemented in some exemplary embodiments as method features can also optionally be implemented in other exemplary embodiments as device features.

The aluminum alloys indicated here are also defined, for example, in the standard EN-573-3 as wrought alloys EN AW-6082 and EN AW-7020.

REFERENCE NUMBER LIST

1 Rolling-element bearing cage
3 Rolling-element bearing cage segment
5 Bridge
7 Side ring
10 Method
12 Forming
14 Machining
16 Producing semi-finished product
18 T6 heat treatment
20 Riveting

The invention claimed is:

1. A rolling-element bearing cage comprising aluminum alloy AA7020 and aluminum alloy AA6082.

2. A rolling-element bearing cage or a rolling-element bearing cage segment comprising a first side ring or a first side ring segment formed from aluminum alloy AA6082 and/or aluminum alloy 7020; and a second side ring or a second side ring segment formed from aluminum alloy AA6082 and/or aluminum alloy 7020; and at least one bridge formed from aluminum alloy AA6082 and/or aluminum alloy 7020, the at least one bridge connecting the first side ring to the second side ring or connecting the first side ring segment to the second side ring segment.

3. The rolling-element bearing cage or rolling-element bearing cage segment according to claim 2, wherein the aluminum alloy AA6082 and/or the aluminum alloy 7020 has a tensile strength $R_m$ of at least 350 MPa.

4. The rolling-element bearing cage or rolling-element bearing cage segment according to claim 2, wherein the rolling-element bearing cage is formed entirely from metal and is free of lead.

5. The rolling-element bearing cage or rolling-element bearing cage segment according to claim 2, wherein the aluminum alloy AA6082 and/or the aluminum alloy 7020 has a yield strength $R_{p0.2}$ of at least 310 MPa.

6. The rolling-element bearing cage or rolling-element bearing cage segment according to claim 2, wherein the aluminum alloy AA6082 and/or the aluminum alloy 7020 has a hardness of at least 100 HBW.

7. The rolling-element bearing cage or rolling-element bearing cage segment according to claim 2, comprising the aluminum alloy AA6082 and not containing the aluminum alloy AA7020.

8. The rolling-element bearing cage or rolling-element bearing cage segment according to claim 2, comprising the aluminum alloy AA7020 and not containing the aluminum alloy AA6082.

9. The rolling-element bearing cage or rolling-element bearing cage segment according to claim 2, wherein the rolling-element bearing cage comprises a plurality of the rolling-element bearing cage segments joined together by rivets.

10. A method comprising:
providing a body of aluminum alloy AA6082 and/or aluminum alloy AA7020; and
forming the body into a rolling-element bearing cage comprising a first side ring, a second side ring and a plurality of bridges connecting the first side ring to the second side ring or forming the body into a rolling-element bearing cage segment comprising a first side ring segment, a second side ring segment and at least one bridge connecting the first side ring segment to the second side ring segment.

11. The method according to claim 10, wherein the body is a semi-finished body and wherein the forming comprises machining the semi-finished body.

12. The method according to claim 11, wherein the machining occurs dry.

13. The method according to claim 10, wherein providing the body comprises forming a rod of aluminum alloy AA6082 and/or aluminum alloy AA7020 into a tube.

14. The method according to claim 13, further comprising performing a T6 heat treatment on the tube.

15. The method according to claim 10, further comprising performing a T6 heat treatment on the body or on the bearing cage or on the bearing cage segment.

16. The method according to claim 10, wherein forming the body into a rolling-element bearing cage comprises forming a plurality of the bearing cage segments and riveting the plurality of bearing cage segments together.

* * * * *